(12) United States Patent
Mugunda et al.

(10) Patent No.: US 11,755,786 B2
(45) Date of Patent: Sep. 12, 2023

(54) COMMAND AUTHORITY EXTENSION SYSTEM AND METHOD FOR SECURITY PROTOCOL AND DATA MODEL (SPDM) SECURE COMMUNICATION CHANNELS

(71) Applicant: Dell Products, L.P., Round Rock, TX (US)

(72) Inventors: Chandrasekhar Mugunda, Austin, TX (US); Chandrashekar Nelogal, Round Rock, TX (US); Rama Rao Bisa, Bangalore (IN); Vineeth Radhakrishnan, Bangalore (IN); Dharma Bhushan Ramaiah, Bengaluru (IN); Viswanath Ponnuru, Bangalore (IN); Shinose Abdul Rahiman, Bangalore (IN)

(73) Assignee: Dell Products, L.P., Round Rock, TX (US)

( * ) Notice: Subject to any disclaimer, the term of this patent is extended or adjusted under 35 U.S.C. 154(b) by 268 days.

(21) Appl. No.: 17/381,584

(22) Filed: Jul. 21, 2021

(65) Prior Publication Data

US 2023/0007874 A1   Jan. 12, 2023

(30) Foreign Application Priority Data

Jul. 8, 2021   (IN) .............................. 202111030704

(51) Int. Cl.
 *G06F 21/74*   (2013.01)
 *G06F 21/54*   (2013.01)
 *G06F 21/57*   (2013.01)
 *G06F 21/85*   (2013.01)

(52) U.S. Cl.
 CPC .............. *G06F 21/74* (2013.01); *G06F 21/54* (2013.01); *G06F 21/572* (2013.01); *G06F 21/85* (2013.01)

(58) Field of Classification Search
 CPC .............. G06F 21/50; G06F 21/52–54; G06F 21/57–572; G06F 21/71; G06F 21/74; G06F 21/75; G06F 21/79; G06F 21/82; G06F 21/84–85; G06F 2212/1052; H04L 63/20
 See application file for complete search history.

(56) References Cited

U.S. PATENT DOCUMENTS

| | | | |
|---|---|---|---|
| 10,079,681 B1* | 9/2018 | Roth | G06F 21/53 |
| 2019/0132362 A1* | 5/2019 | Hutchinson | H04L 41/0866 |
| 2019/0236281 A1* | 8/2019 | Hershman | G06F 21/85 |
| 2020/0257460 A1* | 8/2020 | Som | G06F 12/1466 |

* cited by examiner

*Primary Examiner* — Kevin Bechtel
(74) *Attorney, Agent, or Firm* — Fogarty LLP

(57) ABSTRACT

An Information Handling System (IHS) includes at least one hardware device in communication with a Baseboard Management Controller (BMC). The hardware device includes executable instructions for establishing a secure communication channel with the BMC, and subsequently receiving a list of allowed commands from the BMC. When a command is received by the hardware device, it determines whether the command is included in the list such that when the command is in the list and the command is received within the secure communication channel, the hardware device performs the command. However, when the command is in the list and the command is received outside of the secure communication channel, the hardware device ignores the command.

20 Claims, 3 Drawing Sheets

COMMAND AUTHORITY EXTENSION SYSTEM AND METHOD FOR SECURITY PROTOCOL AND DATA MODEL (SPDM) SECURE COMMUNICATION CHANNELS

CROSS REFERENCE TO RELATED APPLICATIONS

This patent application claims priority to co-pending, commonly assigned Indian Patent Application No. 202111030704, filed Jul. 8, 2021 and entitled "Command Authority Extension System and Method for Security Protocol and Data Mod& (SPDM) Secure Communication Channels;" the entire contents of which are incorporated by reference herein.

FIELD

This disclosure relates generally to Information Handling Systems (IHSs), and more specifically, to a command authority extension system and method for security protocol and data model (SPDM) secure communication channels.

BACKGROUND

As the value and use of information continues to increase, individuals and businesses seek additional ways to process and store information. One option is an Information Handling System (IHS). An IHS generally processes, compiles, stores, and/or communicates information or data for business, personal, or other purposes. Because technology and information handling needs and requirements may vary between different applications, IHSs may also vary regarding what information is handled, how the information is handled, how much information is processed, stored, or communicated, and how quickly and efficiently the information may be processed, stored, or communicated. The variations in IHSs allow for IHSs to be general or configured for a specific user or specific use such as financial transaction processing, airline reservations, enterprise data storage, global communications, etc. In addition, IHSs may include a variety of hardware, and software components that may be configured to process, store, and communicate information and may include one or more computer systems, data storage systems, and networking systems.

In modern day IHSs, administrative management is often provided via baseboard management controllers (BMCs). The baseboard management controller (BMC) generally includes a specialized microcontroller embedded on the motherboard of the IHS, and provides an interface between system-management software and platform hardware. Different types of sensors built into the IHS report to the BMC on parameters such as temperature, cooling fan speeds, power status, operating system (0/S) status, and the like. The BMC monitors the sensors and can send alerts to a system administrator via the network if any of the parameters do not stay within pre-set limits, indicating a potential failure of the system. The administrator can also remotely communicate with the BMC to take some corrective actions, such as resetting or power cycling the system to get a hung O/S running again. These abilities save on the total cost of ownership of an IHS, particularly when implemented in large clusters, such as server farms.

SUMMARY

According to one embodiment, an information handling system (IHS) includes at least one hardware device in communication with a baseboard management controller (BMC). The hardware device includes executable instructions for establishing a secure communication channel with the BMC, and subsequently receiving a list of allowed commands from the BMC. When a command is received by the hardware device, it determines whether the command is included in the list such that when the command is in the list and the command is received within the secure communication channel, the hardware device performs the command. However, when the command is in the list and the command is received outside of the secure communication channel, the hardware device ignores the command.

A method includes the steps of, by a hardware device, establishing a secure communication channel with a baseboard management controller (BMC), and receiving a list of allowed commands from the BMC. Thereafter, when a command is received, the hardware device determines whether the command is included in the list. The method further includes the steps of performing the command when the command is in the list and the command is received within the secure communication channel, and ignoring the command when the command is in the list and the command is received outside of the secure communication channel.

A baseboard management controller (BMC) includes executable code for establishing a secure communication channel with a hardware device configured in an information handling system (IHS), and transmitting a list of allowed commands to the hardware device. The hardware device is configured to determine whether the command is included in the list, and when the command is in the list and the command is received within the secure communication channel, perform the command. However, when the command is in the list and the command is received outside of the secure communication channel, the hardware device ignores the command.

BRIEF DESCRIPTION OF THE DRAWINGS

The present invention(s) is/are illustrated by way of example and is/are not limited by the accompanying figures, in which like references indicate similar elements. Elements in the figures are illustrated for simplicity and clarity and have not necessarily been drawn to scale.

DETAILED DESCRIPTION

Figure 1:
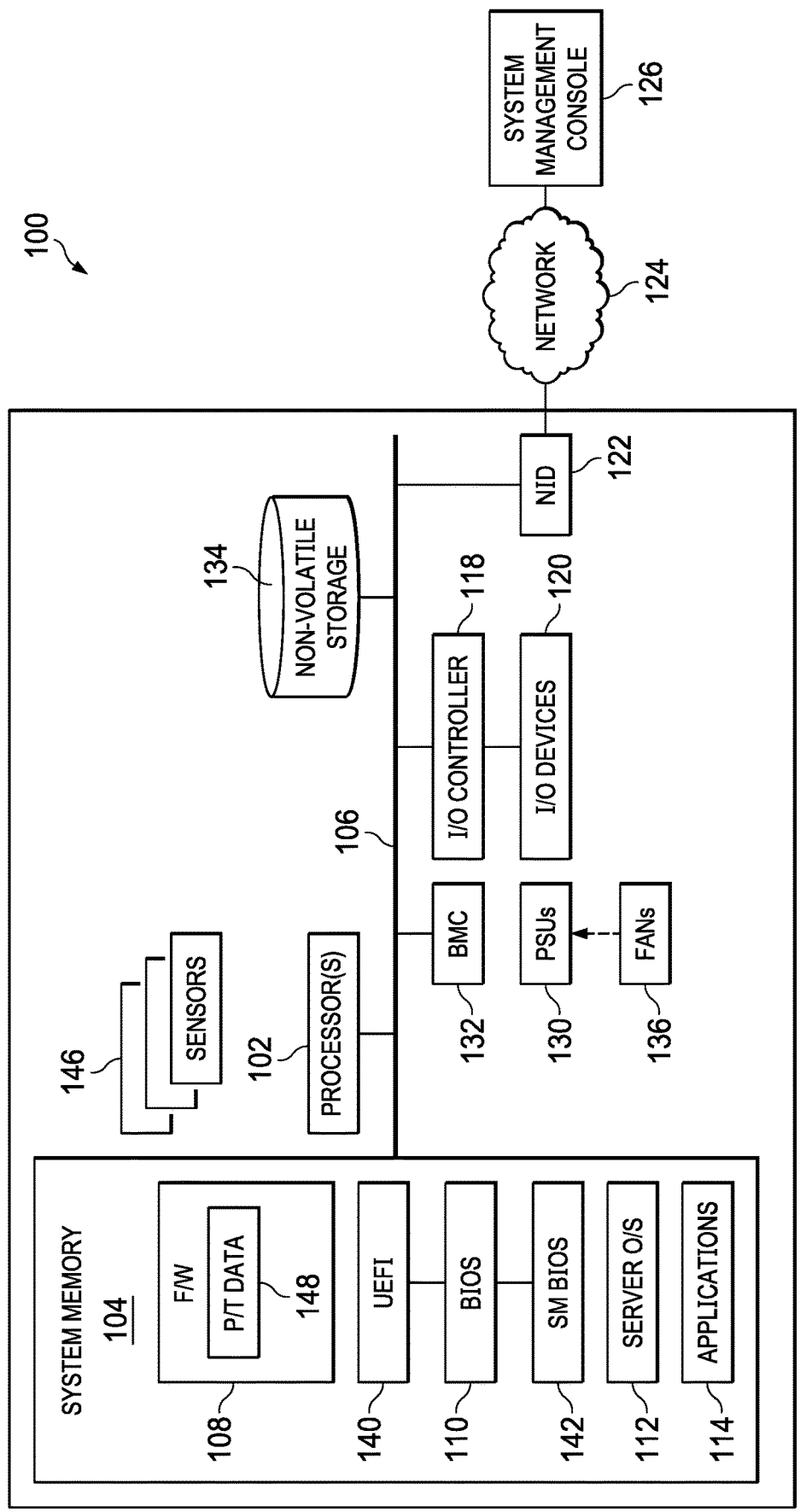
FIG. 1 is a block diagram of examples of components of an Information Handling System (IHS) that may be used to implement a command authority extension system and method according to one embodiment of the present disclosure.

Embodiments of the present disclosure provide a system and method for extending command authority for SPDM secure communication channels over Management Component Transport Protocol (MCTP). Whereas conventional SPDM-based implementations have provided for secure messaging over MCTP-based architectures, such as Peripheral Component Interconnect Express (PCIe) vendor defined message (VDM) channels, the underlying MCTP-based architectures are inherently insecure due to their public accessibility by almost any hardware device to which they are interconnected. In particular implementations involving BMCs that use secure SPDM-based secure messaging for management and control of multiple hardware devices in an IHS, the otherwise secure processes within the SPDM-based sessions can be circumvented by other hardware devices in the IHS using common spoofing techniques. Embodiments of the present disclosure provide a solution to this problem, among others, by providing a technique for extending the command authority for SPDM secure channels by issuing a list of allowed commands to the hardware devices under control of a BMC such that, when the hardware devices encounter certain potentially dangerous or harmful commands, their use can be restricted so that the management functions ordinarily performed within the SPDM secure channels can remain secure.

Certain IHSs may be configured with BMCs that are used to monitor, and in some cases manage computer hardware components of their respective IHSs. A BMC is normally programmed using a firmware stack that configures the BMC for performing out-of-band (e.g., external to a computer's operating system or BIOS) hardware management tasks. The BMC firmware can support industry-standard Specifications, such as the Intelligent Platform Management Interface (IPMI) and Systems Management Architecture of Server Hardware (SMASH) for computer system administration.

Baseboard management controllers (BMCs) are particularly well suited for the features provided by the SPDM specification. A BMC generally includes a specialized microcontroller embedded in the IHS, and may provide an interface between system-management software and platform hardware. Different types of sensors built into the IHS report to the BMC on parameters such as temperature, cooling fan speeds, power status, operating system (O/S) status, and the like. The BMC monitors the sensors and can send alerts to a system administrator via the network if any of the parameters do not stay within pre-set limits, indicating a potential failure of certain hardware devices in the IHS. The administrator can also remotely communicate with the BMC to take certain corrective actions, such as resetting or power cycling the system to get a hung O/S running again. These abilities can often save on the total cost of ownership of an IHS, particularly when implemented in large clusters, such as server farms.

The security protocol and data model (SPDM) specification defines messages and procedures for secure communication among hardware devices, which includes authentication of hardware devices and session key exchange protocols to provide secure communication among those hardware devices. Management Component Transport Protocol (MCTP) Peripheral Component Interconnect Express (PCIe) vendor defined message (VDM) channels, which supports peer-to-peer messaging (e.g., route by ID), allow a SPDM-enabled hardware device to issue commands to other SPDM-enabled hardware devices within a secure communication channel. The MCTP PCIe-VDM channels also allow the SPDM-enabled hardware device to issue commands to other SPDM-enabled hardware devices outside of a secure communication channel using plain text format messaging (e.g., non-type 6 messaging) as specified by the MCTP specification. Within this disclosure, type 6 messaging shall be construed to be a type of messaging that occurs within a secure communication channel, while plain text format messaging shall be construed to be another type of messaging that occurs outside of the secure communication channel.

Even though the BMC may have established a secure SPDM communication channel with a hardware device, an intruder can act as a BMC (e.g., spoofing) and send sensitive commands over MCTP outside of the secure communication channel using plain text format (non-type 6) messaging, thus circumventing the ability of the BMC to perform its tasks of managing the operations of the hardware devices in an IHS. For example, a SPDM-enabled hardware device, even if authenticated, can change the configuration of other hardware devices (e.g., Dell PowerEdge RAID Controllers (PERC) Device IDs, network interface card (NIC) network partitions, etc.). As will be described in detail herein below, embodiments of the present disclosure provide a command authority extension system and method for BMCs implemented with SPDM-enabled hardware devices in an IHS that provide a solution to the aforedescribed problems, among other problems, with conventional SPDM-based secure communication channels.

For purposes of this disclosure, an IHS may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an IHS may be a personal computer (e.g., desktop or laptop), tablet computer, mobile device (e.g., Personal Digital Assistant (PDA) or smart phone), server (e.g., blade server or rack server), a network storage device, or any other suitable device and may vary in size, shape, performance, functionality, and price. An IHS may include Random Access Memory (RAM), one or more processing resources such as a Central Processing Unit (CPU) or hardware or software control logic, Read-Only Memory (ROM), and/or other types of nonvolatile memory.

Additional components of an IHS may include one or more disk drives, one or more network ports for communicating with external devices as well as various I/O devices, such as a keyboard, a mouse, touchscreen, and/or a video display. As described, an IHS may also include one or more buses operable to transmit communications between the various hardware components. An example of an IHS is described in more detail below.

For purposes of this disclosure, an IHS may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, science, control, or other purposes. For example, an IHS may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price.

The IHS may include random access memory (RAM), one or more processing resources such as a central processing unit (CPU) or hardware or software control logic, ROM, and/or other types of nonvolatile memory. Additional components of the IHS may include one or more disk drives, one or more network ports for communicating with external devices as well as various input and output (I/O) devices, such as a keyboard, a mouse, touchscreen and/or a video display. The IHS may also include one or more buses operable to transmit communications between the various hardware components.

FIG. 1 is a block diagram of examples of components of an Information Handling System (IHS) 100 that may be used to implement a command authority extension system and method according to one embodiment of the present disclosure. Particularly, IHS 100 includes one or more processor (s) 102 coupled to system memory via system interconnect 106. System interconnect 106 may include any suitable system bus. System memory 104 may include a plurality of software and/or firmware modules including firmware (F/W) 108, basic input/output system (BIOS) 110, operating system (O/S) 112, and/or application(s) 114. Software and/or firmware module(s) stored within system memory 104 may be loaded into processor(s) 102 and executed during operation of IHS 100.

In one embodiment, system interconnect 106 comprises a Peripheral Component Interconnect Express (PCIe) system bus. The PCIe bus provides a common motherboard interface for interconnecting the IHS 100 with various hardware devices, such as storage controllers, graphic cards, and I/O controllers (e.g., USB expansion ports, Wi-Fi interface cards, Ethernet cards, etc.). The PCIe bus supports a Management Component Transport Protocol (MCTP) that supports communications between the motherboard of the IHS 100 and hardware devices. The MCTP protocol communication model defines a message format, transport description, message exchange patterns, and operational endpoint characteristics. One particular component of the specification involves PCIe vendor defined messages (VDMs) that allows hardware device developers to create custom messages specific to their particular hardware device implementations. Additional details of PCIe-VDMs will be described in detail herein below.

F/W 108 may include a power/thermal profile data table 148 that is used to store power profile data and thermal profile data for certain hardware devices (e.g., processor(s) 102, system memory 104, non-volatile storage 134, NID 122, I/O controllers 118, etc.). System memory 104 may include a UEFI interface 140 and/or a SMBIOS interface 142 for accessing the BIOS as well as updating BIOS 110. In general, UEFI interface 140 provides a software interface between an operating system and BIOS 110. In many cases, UEFI interface 140 can support remote diagnostics and repair of computers, even with no operating system installed. SMBIOS interface 142 can be used to read management information produced by BIOS 110 of an IHS 100. This feature can eliminate the need for the operating system to probe hardware directly to discover what devices are present in the computer.

IHS 100 includes one or more input/output (I/O) controllers 118 which manages the operation of one or more connected input/output (I/O) device(s) 120, such as a keyboard, mouse, touch screen, microphone, a monitor or display device, a camera, a microphone, audio speaker(s) (not shown), an optical reader, a universal serial bus (USB), a card reader, Personal Computer Memory Card International Association (PCMCIA) slot, and/or a high-definition multimedia interface (HDMI), which may be included or coupled to IHS 100.

IHS 100 includes Network Interface Device (NID) 122. NID 122 enables IHS 100 to communicate and/or interface with other devices, services, and components that are located externally to IHS 100. These devices, services, and components, such as a system management console 126, can interface with IHS 100 via an external network, such as network 124, which may include a local area network, wide area network, personal area network, the Internet, etc.

IHS 100 further includes one or more power supply units (PSUs) 130. PSUs 130 are coupled to a BMC 132 via an $I^2C$ bus. BMC 132 enables remote operation control of PSUs 130 and other components within IHS 100. PSUs 130 power the hardware devices of IHS 100 (e.g., processor(s) 102, system memory 104, non-volatile storage 134, NID 122, I/O controllers 118, etc.). To assist with maintaining temperatures within specifications, an active cooling system, such as one or more fans 136 may be utilized.

IHS 100 further includes one or more sensors 146. Sensors 146 may, for instance, include a thermal sensor that is in thermal communication with certain 245 hardware devices that generate relatively large amounts of heat, such as processors 102 or PSUs 130. Sensors 146 may also include voltage sensors that communicate signals to BMC 132 associated with, for example, an electrical voltage or current at an input line of PSU 130, and/or an electrical voltage or current at an output line of PSU 130.

BMC 132 may be configured to provide out-of-band management facilities for IHS 100. Management operations may be performed by BMC 132 even if IHS 100 is powered off, or powered down to a standby state. BMC 132 may include a processor, memory, and an out-of-band network interface separate from and physically isolated from an in-band network interface of IHS 100, and/or other embedded resources.

In certain embodiments, BMC 132 may include or may be part of a Remote Access Controller (e.g., a DELL Remote Access Controller (DRAC) or an Integrated DRAC (iDRAC)). In other embodiments, BMC 132 may include or may be an integral part of a Chassis Management Controller (CMC).

Figure 2:
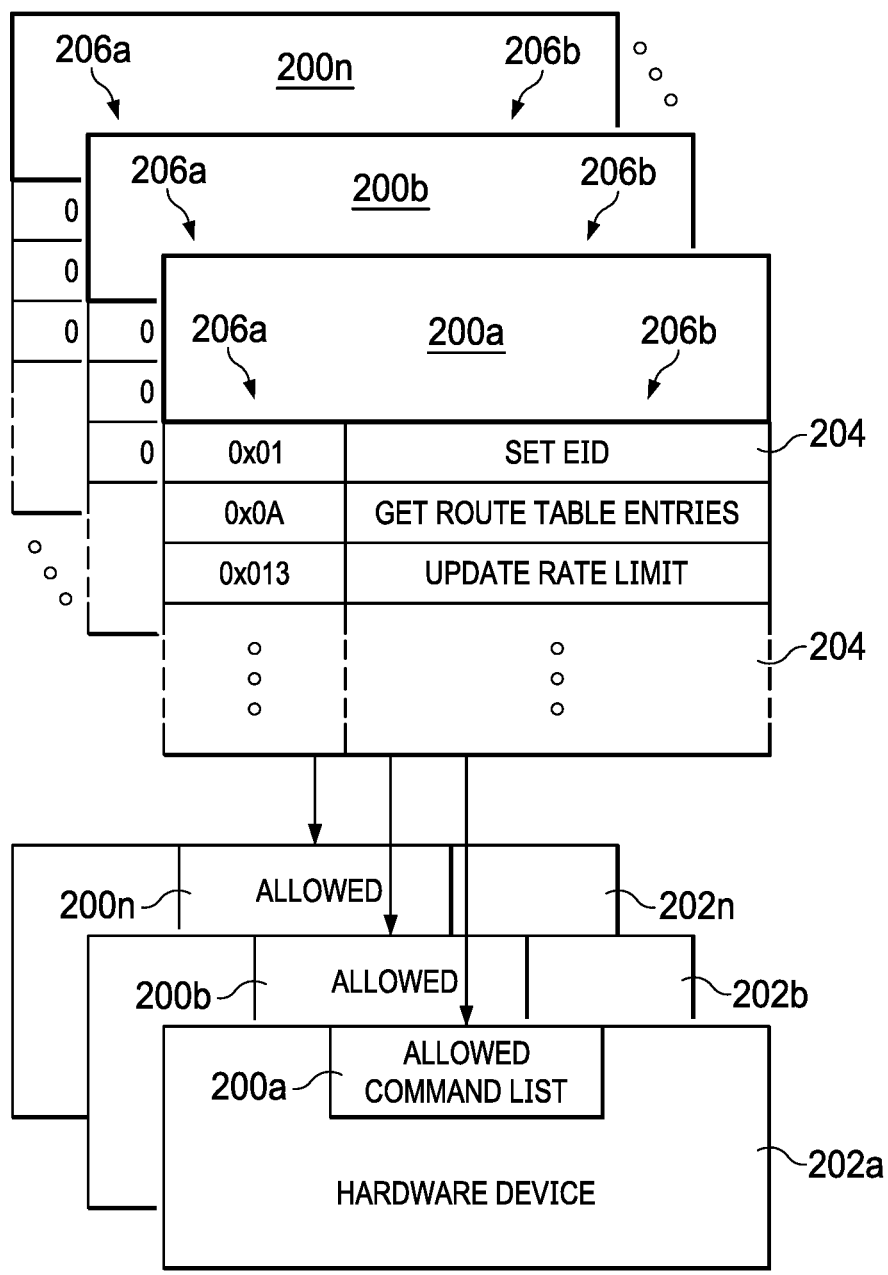
FIG. 2 illustrates an example data structure of a set of allowed command lists that may be stored and accessed by the hardware devices of an IHS for implementing the command authority extension system according to one embodiment of the present disclosure.

FIG. 2 illustrates an example data structure of a set of allowed command lists 200a-n that may be stored and accessed by the hardware devices 202a-n of an IHS 100 for implementing the command authority extension system according to one embodiment of the present disclosure. The allowed command lists 200a-n are each associated with a type of hardware device 202a-n in the IHS 100. The hardware devices 202a-n may be any type that can be managed by the BMC 132. Examples of such hardware devices 202a-n may include, for example, storage controllers, graphic cards, and I/O interfaces (e.g., USB expansion ports, Wi-Fi interface cards, Ethernet cards, etc.).

In the particular example shown, a first allowed command list 200a includes a list of generic allowed commands, while a second allowed command list 200b includes a list of allowed commands associated with storage controller hardware devices 202b, such as one that may be used to control non-volatile storage 134. Additionally, a third allowed command list 200n includes a list of generic allowed commands associated with I/O controller hardware devices 202n, such as I/O controller 118. Although the present example embodiment describes multiple allowed command lists 200a-n that are each associated with a particular type of hardware device 202a-n, it should be appreciated that other embodiments may provide multiple allowed command lists associated with other aspects of the hardware devices managed by the BMC 132. For example, the command authority extension system may include multiple allowed command lists in which at least one allowed command list is associated with a particular make and model of hardware device configured in the IHS 100. Additionally, the command authority extension system may be implemented with a single allowed command list that may be used for some, most, or all hardware devices in the IHS 100.

Each allowed command list 200a-n is arranged in table form with rows 204 representing one or more allowed commands, and columns 206a-b representing certain fields associated with each allowed command. In general, the allowed commands identify a subset of available DCTP commands that are allowed to be processed by the hardware devices managed by the BMC 132. That is, the allowed commands can be considered to be a "whitelist" that explicitly designates which commands may be processed by the hardware devices.

Each allowed command list 200a-n includes a command code field 204a, and a command name field 206b. The command code field 204a indicates the MCTP equivalent byte code associated with the allowed command, while the command name field 206b indicates free form human-readable text describing its respective allowed command. As will be described in detail herein below, the allowed command lists 200a-n provide a technique for extending the authority to control which commands are allowed to be performed on the hardware devices 202 from a secure SPDM communication session.

Although FIG. 2 describes one example set of allowed command lists 200a-n that may be used to extend the authority of commands issued to hardware devices 202a-n outside of a secure communication channel, the features of the disclosed allowed command lists 200a-n may be embodied in other specific forms without deviating from the spirit and scope of the present disclosure. For example, the allowed command lists 200a-n may include additional, fewer, or different fields than those explicitly described herein. As another example, only a single allowed command list may be provided to extend the authority of commands issued to the hardware devices 202a-n configured in the IHS 100.

Figure 3:
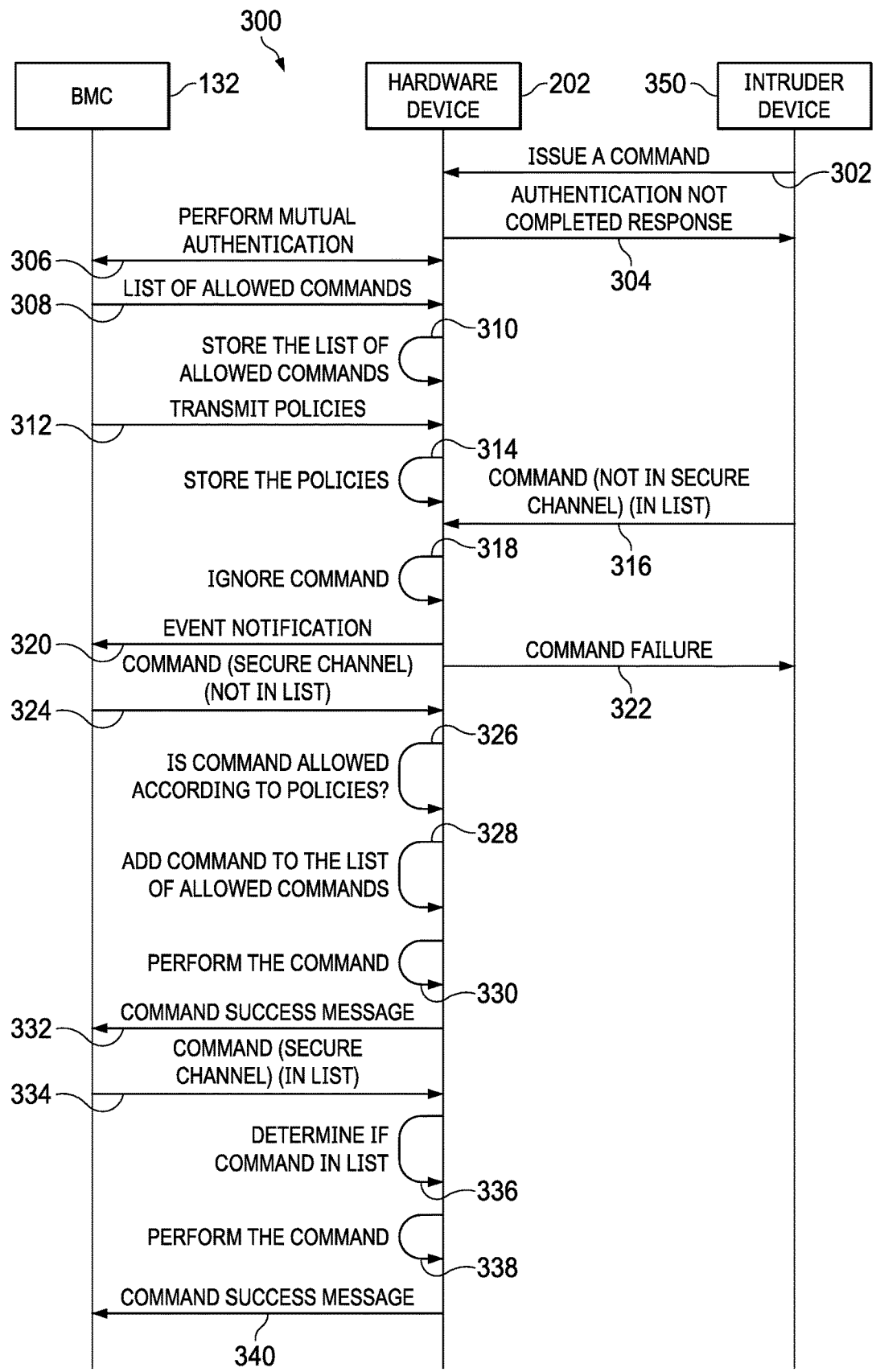
FIG. 3 illustrates an example flow diagram of command authority extension method according to one embodiment of the present disclosure.

FIG. 3 illustrates an example flow diagram of a command authority extension method 300 according to one embodiment of the present disclosure. Additionally or alternatively, the method 300 may be performed in whole or in part by the BMC 132 and one of the hardware devices 202 as described above. The BMC 132 may include instructions that are stored in its memory and executed by its processor(s) for performing its respective steps described below. Likewise, the hardware device 202 may include instructions that are stored in its memory and executed by its processor(s) for performing its respective steps described below.

Initially, the hardware devices 202 are inhibited from processing any commands other than those used for mutually authenticating the BMC 132 with the hardware device 202. Although only one hardware device 202 is shown and described, it should be understood that the method 300 can be practiced with any quantity of hardware devices 202 configured with the BMC 132. Additionally, the method 300 may be performed at any time. In one embodiment, the method 300 is performed after the IHS 100 and its associated BMC 132 are booted.

At step 302, an intruder device 350 attempts to issue a command to the hardware device 202. But because the command was issued outside of a secure communication channel, the command is disallowed and the hardware device 202 transmits an authentication not completed response at step 304. That is, the hardware device 202 is executed to disallow or reject some, most, or all commands that are not received through a secure communication channel, such as one established using, the SPDM protocol.

At step 306, the BMC 132 and hardware device 202 perform mutual authentication with one another. In one embodiment, the mutual authentication may involve establishing a secure communication channel using the SPDM protocol. At this point, the BMC 132 and hardware device 202 are mutually authenticated with one another, and thus can communicate in a relatively secure manner to perform their respective processes.

Thereafter at step 308, the BMC 132 transmits one of the allowed command lists 200a-n to the hardware device 202. For example, the BMC 132 may determine a type of hardware device based upon information obtained during the mutual authentication process and/or by information obtained during a previously performed discovery process. Using this determination, the BMC 132 may identify one of the multiple allowed command lists 200 A-N to transmit to the hardware device 202. Moreover, the BMC 132 may identify the one allowed command lists 200 A-N according to the type of hardware device, or according to make and model of the hardware device. Additionally, the BMC 132 may transmit a single list of allowed commands that is configured to be used for some, most, or all hardware devices 202 in the IHS 100. The hardware device 202 then stores the list of allowed commands 200a-n in its memory at step 310.

At step 312, the BMC 132 transmits one or more policies to the hardware device 202. The hardware device 202 then stores the policies in its memory at step 314. The policies are used by the hardware device 202 to determine whether or not to ignore a received command through the secure communication channel established at step 306 in which the command is not in the list of allowed commands. For example, scenarios exist where firmware updates are performed on the BMC 132 at different times from when firmware updates are performed on the hardware device 202. As such, a recent firmware update performed on the BMC 132 may include newly included logic for issuing a particular command that has yet to be added to the allowed command list 200. However, because the command is received through the secure communication channel, its authenticity exists at such a level that certain policies may be applied to determine whether the command is allowed based upon certain policies received from the BMC 132. One example of such a policy may be one where the command is disallowed when the current firmware loaded on the hardware device 202 has a publish date greater than a certain period of time (e.g., 1 year). Another example policy may be one where the command is disallowed when it immediately follows a certain sequence of previous commands in which the sequence of commands indicates a particular intrusion pattern. Yet another example policy involving a graphics processing hardware device 202 includes one that disallows a command when its processing capacity is currently greater than a certain level (e.g., 50 percent).

At this point, the command authority extension method 300 has been setup and is ready to begin validating commands. In general, steps 316 through 330 described below, among other things, validate ensuing commands received by the hardware device 202 to determine whether they are to be performed or disallowed.

Steps 316 through 322 describe the actions that may be performed when the intruder device 350 attempts to issue a command to the hardware device 202. At step 316, the intruder device 350 attempts to issue a command that is included in the list of allowed commands. Because the hardware device 202 is configured to disallow commands that are not received through the secure communication channel, however, the command is ignored at step 318, and an event notification (e.g., AEN) transmitted to the BMC 132 at step 320. In one embodiment, the BMC 132 may store the event notification in a logfile and, in some cases, transmit the event notification to an administrative computer, such as an entity that manages the operation of the IHS 100 through a publicly available network, such as the Internet.

Nevertheless, when the command received at step 316 is not in the list of allowed commands, the hardware device 202 may, in response, transmit a command failure response at step 322. Such a case may exist when another hardware device 202 inadvertently sends a command to the hardware device 202 that, while being improper, does not necessarily mean that malicious intent was involved. This may be particularly true when the command has not been included in the list of allowed commands 200. As such, the command may be disallowed without generating an event notification in some embodiments.

Steps 324 through 332 describe the actions that may be performed when the BMC 132 issues a command to the hardware device 202 through the secure communication channel in which the command is not in the list of allowed commands. At step 324, the BMC 132 transmits a command through the secure communication channel in which the command is not in the list of allowed commands 200. Thus, as described above, the hardware device 202 at step 326, may determine according to one or more policies received at step 312, whether or not the command is to be allowed when not in the list of allowed commands 200. When the command is allowed according to the policies, the hardware device 202 may add information associated with the command to the list of allowed commands 200 at step 328, perform the command at step 330, and transmit a command success message to the BMC 132 at step 332. If, however, the command is disallowed according to the policies, steps 328, 330, and 332 will not be performed.

Steps 334 through 338 describe the actions that may be performed when the BMC 132 issues a command to the hardware device 202 through the secure communication channel in which the command is in the list of allowed commands. At step 334, the BMC 132 transmits a command through the secure communication channel in which the command is in the list of allowed commands 200. The hardware device 202 at step 336, may determine that the received command is included in the list of allowed commands. Because the hardware device 202 determines that the command was received through the secure communication channel and the command is in the list of allowed commands, it performs the command at step 338, and sends a command success message to the BMC 132 at step 340.

When the command is allowed according to the policies, the hardware device 202 may add information associated with the command to the list of allowed commands 200 at step 328, perform the command at step 330, and transmit a command success message to the BMC 132 at step 332. If, however, the command is disallowed according to the policies, steps 328, 330, and 332 will not be performed.

The method 300 described above can be continually performed for validating commands received by the hardware device 202 to determine whether they are to be performed or disallowed. Nevertheless, when use of the command authority extension method 300 is no longer needed or desired, the method 300 ends.

Although FIG. 3 describes an example command authority extension method 300 that may be performed for validating commands received by the hardware device 202 to determine whether they are to be performed or disallowed, the features of the method 300 may be embodied in other specific forms without deviating from the spirit and scope of the present disclosure. For example, the method 300 may perform additional, fewer, or different operations than those described in the present examples. As another example, certain steps of the method 300 may be performed by other components in the IHS 100 other than those described above (e.g., the BMC 132 and hardware device 202).

It should be understood that various operations described herein may be implemented in software executed by logic or processing circuitry, hardware, or a combination thereof. The order in which each operation of a given method is performed may be changed, and various operations may be added, reordered, combined, omitted, modified, etc. It is intended that the invention(s) described herein embrace all such modifications and changes and, accordingly, the above description should be regarded in an illustrative rather than a restrictive sense.

Although the invention(s) is/are described herein with reference to specific embodiments, various modifications and changes can be made without departing from the scope of the present invention(s), as set forth in the claims below. Accordingly, the specification and figures are to be regarded in an illustrative rather than a restrictive sense, and all such modifications are intended to be included within the scope of the present invention(s). Any benefits, advantages, or solutions to problems that are described herein with regard to specific embodiments are not intended to be construed as a critical, required, or essential feature or element of any or all the claims.

Unless stated otherwise, terms such as "first" and "second" are used to arbitrarily distinguish between the elements such terms describe. Thus, these terms are not necessarily intended to indicate temporal or other prioritization of such elements. The terms "coupled" or "operably coupled" are defined as connected, although not necessarily directly, and not necessarily mechanically. The terms "a" and "an" are defined as one or more unless stated otherwise. The terms "comprise" (and any form of comprise, such as "comprises" and "comprising"), "have" (and any form of have, such as "has" and "having"), "include" (and any form of include, such as "includes" and "including") and "contain" (and any form of contain, such as "contains" and "containing") are open-ended linking verbs. As a result, a system, device, or apparatus that "comprises," "has," "includes" or "contains" one or more elements possesses those one or more elements but is not limited to possessing only those one or more elements. Similarly, a method or process that "comprises," "has," "includes" or "contains" one or more operations possesses those one or more operations but is not limited to possessing only those one or more operations.

The invention claimed is:

1. An Information Handling System (IHS), comprising:
a hardware device in communication with a Baseboard Management Controller (BMC), the hardware device comprising one or more processors and one or more memory units including instructions that, upon execution by the processors, are executed to:
establish a secure communication channel with the BMC;
receive a list of allowed commands from the BMC;
when a command is received, determine whether the command is included in the list;
when the command is in the list and the command is received within the secure communication channel, perform the command; and when the command is in the list and the command is received outside of the secure communication channel, ignore the command.

2. The IHS of claim 1, wherein the instructions are further executed to send an event notification to the BMC when the command is received outside of the secure communication channel.

3. The IHS of claim 1, wherein the instructions are further executed to perform the command based upon one or more policies when the command is not in the list and the command is received within the secure communication channel.

4. The IHS of claim 3, wherein the instructions are further executed to receive and store the one or more policies after the secure communication channel has been established.

5. The IHS of claim 3, wherein the policies are included in a firmware image associated with the hardware device, the policies being stored in the hardware device during a firmware update of the hardware device using the firmware image.

6. The IHS of claim 1, wherein the instructions are further executed to inhibit processing of any command until the secure communication channel is established.

7. The IHS of claim 1, wherein the instructions are further executed to receive and store the list of allowed commands after the secure communication channel has been established.

8. The IHS of claim 7, wherein the list of allowed commands are associated with a type of the hardware device.

9. The IHS of claim 1, wherein the secure communications channel comprises a SPDM session, and receiving the command within the secure communication channel comprises receiving the command using SPDM type 6 messages.

10. The IHS of claim 1, wherein receiving the command outside of the secure communication channel comprises receiving the command that is included in a non-type 6 SPDM message.

11. A method comprising:
  establishing, using instructions stored in a memory and executed by at least one processor, a secure communication channel with a baseboard management controller (BMC);
  receiving, using the instructions, a list of allowed commands from the BMC;
  when a command is received, determining, using the instructions, whether the command is included in the list, wherein a first and second command are received and are included in the list, wherein the first command is received within the secure communication channel, and wherein the second command is received outside the communication channel;
  performing, using the instructions, the command when the command is in the list and the command is received within the secure communication channel; and
  ignoring, using the instructions, the command when the command is in the list and the command is received outside of the secure communication channel.

12. The method of claim 11, further comprising sending an event notification to the BMC when the command is received outside of the secure communication channel.

13. The method of claim 11, further comprising performing the command based upon one or more policies when the command is not in the list and the command is received within the secure communication channel.

14. The method of claim 11, further comprising inhibiting processing of any command until the secure communication channel is established.

15. The method of claim 11, further comprising receiving and storing the list of allowed commands after the secure communication channel has been established.

16. A Baseboard Management Controller (BMC) comprising:
  one or more processors and one or more memory units including instructions that, upon execution by the processors, are executed to:
    establish a secure communication channel with a hardware device configured in an information handling system (IHS);
    transmit a list of allowed commands to the hardware device,
    wherein the hardware device is configured to:
      when a command is received, determine whether the command is included in the list;
      when the command is in the list and the command is received within the secure communication channel, perform the command; and
      when the command is in the list and the command is received outside of the secure communication channel, ignore the command.

17. The BMC of claim 16, wherein the hardware device is further configured to send an event notification to the BMC when the command is received outside of the secure communication channel, and wherein the instructions are further executed to transmit the received event notification to an administrator computer.

18. The BMC of claim 16, wherein the instructions are further executed to transmit one or more policies to the hardware device, wherein the hardware device is configured to perform the command based on the policies when the command is not in the list and the command is received within the secure communication channel.

19. The BMC of claim 18, wherein the instructions are further executed to transmit the one or more policies after the secure communication channel has been established.

20. The BMC of claim 16, wherein the instructions are further executed to transmit the list of allowed commands after the secure communication channel has been established.

* * * * *